(No Model.) 3 Sheets—Sheet 1.
F. MANSFIELD.
ELECTRIC RAILWAY.
No. 579,760. Patented Mar. 30, 1897.
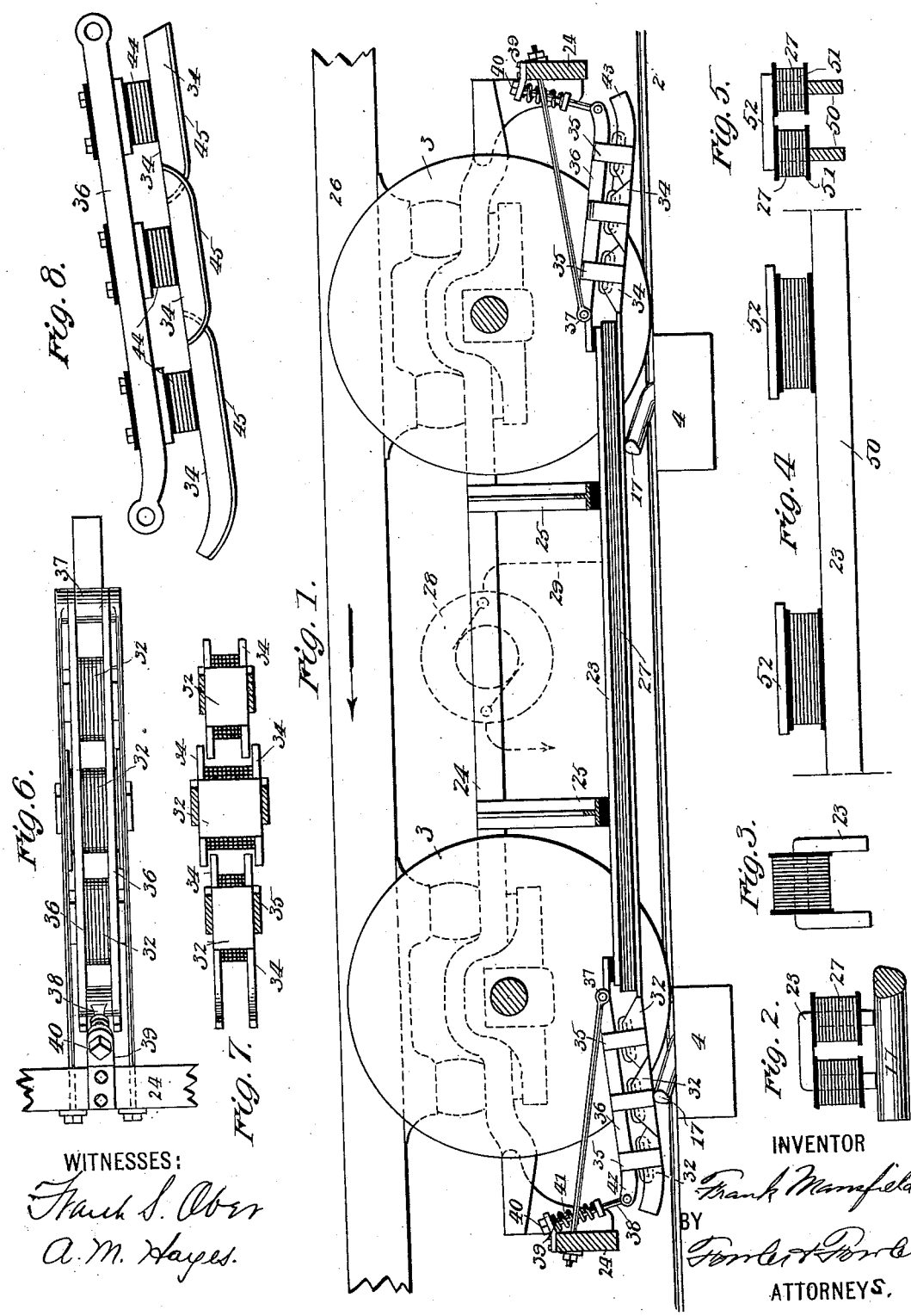
WITNESSES:
Frank S. Ober
A. M. Hayes.
INVENTOR
Frank Mansfield
BY
ATTORNEYS.

(No Model.)  F. MANSFIELD.  3 Sheets—Sheet 2.
ELECTRIC RAILWAY.
No. 579,760.  Patented Mar. 30, 1897.
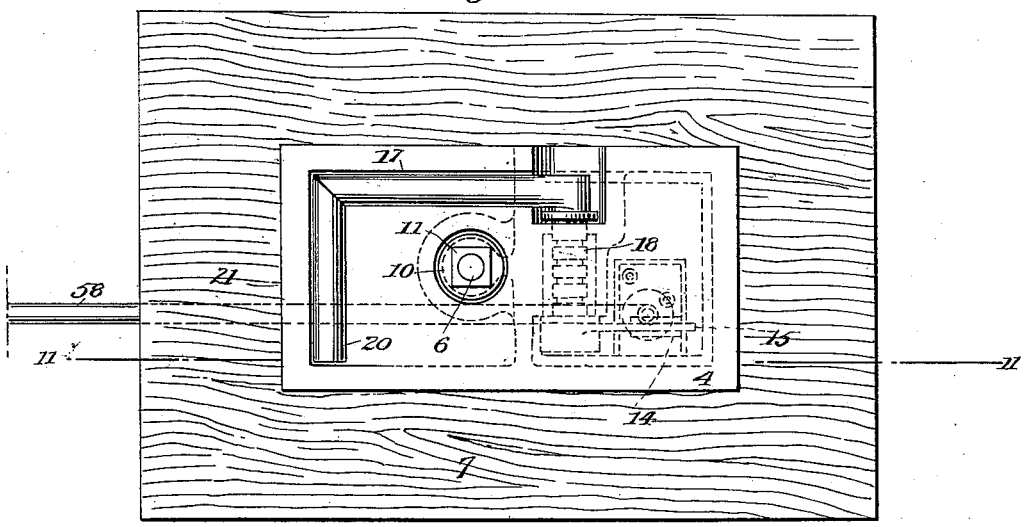
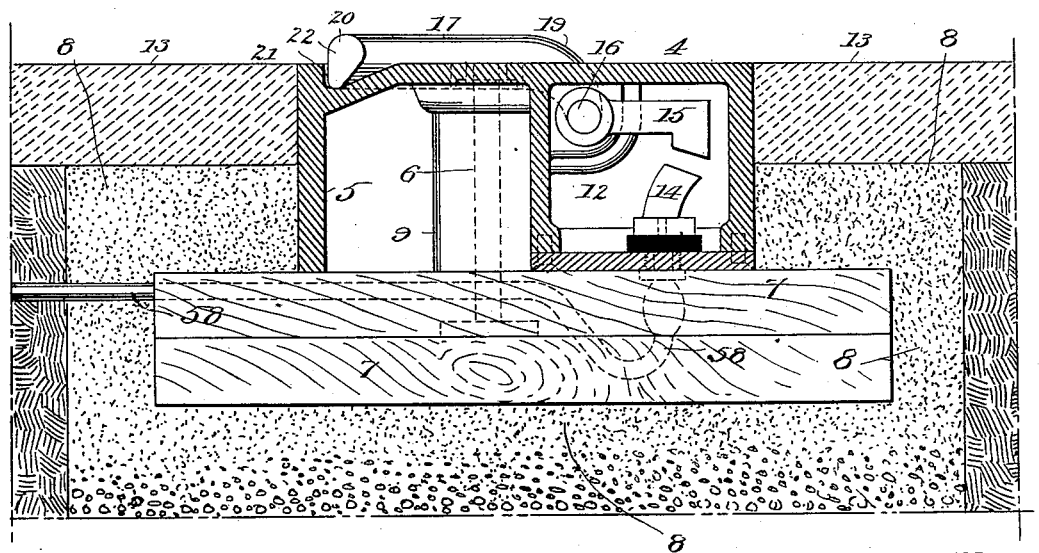
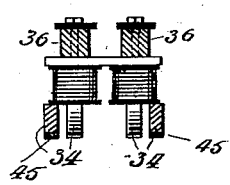
WITNESSES:  INVENTOR
Frank S. Ober  Frank Mansfield
A. M. Hayes  BY Fowler & Fowler
  ATTORNEYS

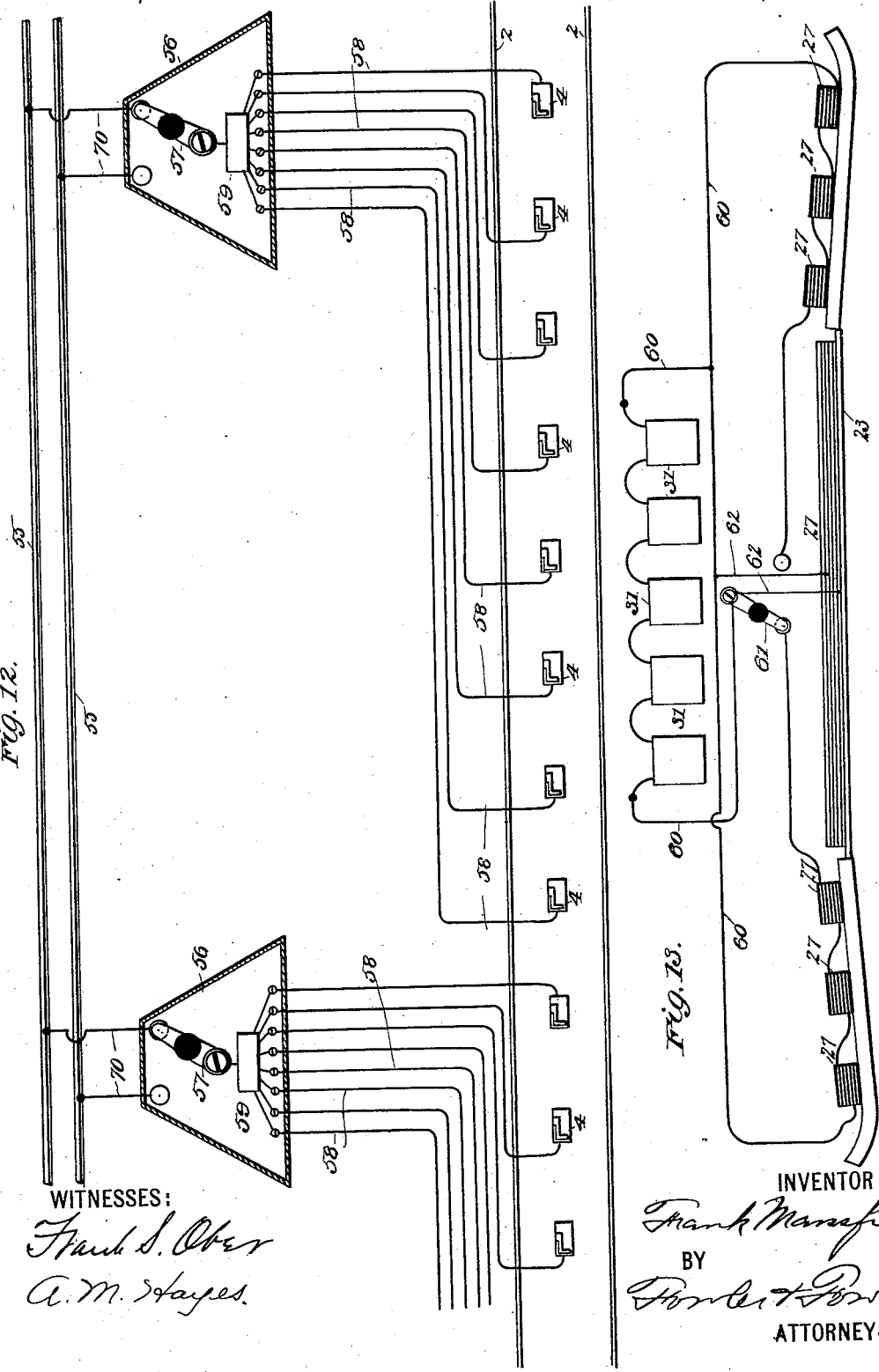

UNITED STATES PATENT OFFICE.

FRANK MANSFIELD, OF PHILADELPHIA, PENNSYLVANIA.

ELECTRIC RAILWAY.

SPECIFICATION forming part of Letters Patent No. 579,760, dated March 30, 1897.

Application filed August 13, 1895. Serial No. 559,117. (No model.)

*To all whom it may concern:*

Be it known that I, FRANK MANSFIELD, a citizen of the United States, residing at Philadelphia, county of Philadelphia, and State of Pennsylvania, have invented certain new and useful Improvements in Electric Railways, of which the following is such a full, clear, and exact description as will enable any one skilled in the art to which it appertains to make and use the same, reference being had to the accompanying drawings, forming part of this specification.

My invention relates to the class of electric railways in which the electric connection is made between a moving car or vehicle and a stationary conductor above the surface of the ground in such way as to limit the exposed surface of the charged circuit; and the invention consists in the various novel and peculiar arrangements and combinations of the several parts of the apparatus, all as hereinafter fully described and then pointed out in the claims.

I have illustrated a type of my invention in the accompanying drawings, wherein—

Figure 1 is a view of the lower portion of a car provided with my improvements, axles and portions of the truck being shown in a central vertical section. In this view portions of the car-track and road-bed are shown together with two of the circuit-completers and their switch-boxes which are set in the road-bed. Fig. 2 is an enlarged end view of the contact bar or magnet shown as detached. A portion of the circuit-completing lever is also shown in this view. Figs. 3, 4, and 5 show modified forms of the contact device, as hereinafter described. Fig. 6 is an enlarged plan view of the set of magnetic bars or magnets and the frame for carrying them, and Fig. 7 is a view of the same in section on a horizontal plane passing through the cores of the magnets. Fig. 8 is a side view of a modified form of the set of magnets. Fig. 9 is a cross-section of the same. Fig. 10 is an enlarged plan view of a circuit-completer and its switch-box; and Fig. 11 is a view of the same in section on a vertical plane indicated by line 11 11, Fig. 10, the box being set in the ground. Fig. 12 shows a plan view of a track provided with a set of circuit-completers, together with the arrangement of the branch circuits in which the circuit-completers are located and the duplicate main conductors, together with the junction switch-boxes. Fig. 13 is a diagram showing the electrical connections between the batteries carried by the car, the magnetic contact device, and the set of magnets at each end of the contact-bar.

Referring to the drawings, in which like numbers of reference indicate like parts throughout, 2 designates the ordinary rails, 3 the car-wheels, and 24 the car-truck. At suitable distances apart I arrange the switch-boxes 4 in a line along the track, they being set in the ground with their upper surfaces flush with the surface thereof and surrounded with asphaltum 13. Each of these boxes comprises a casing 5, made, preferably, of cast-iron and secured by means of a vertical bolt 6 to a wooden bed 7, set in bituminous concrete 8.

The head of the bolt 6 is secured to the wooden bed, and the bolt passes up through a socket 9, extending vertically through the casing, the upper surface of which is recessed at 10 to receive the nut 11 of the bolt. A branch conductor 58, leading from the main conductor 55, which supplies the electric current, extends into a water-tight compartment 12 in the box, where it is provided with a terminal 14, against which closes a switch-arm or terminal 15, mounted upon the rock-shaft 16, which extends through the side of the box and carries at its outer end the circuit-completer or contact-lever 17. The rock-shaft 16 is provided with a screw-threaded joint 18, which permits the shaft to be turned or rocked on its axis, in order to operate the switch, and at the same time makes the joint water-tight. The shaft is made of metal, so as to serve as an electrical conductor, likewise the lever, the inner end of which is slightly curved, as at 19, while its outer end is bent at right angles or is provided with an offset 20, making it L-shaped in plan view. This lever is made somewhat wedge-shaped in cross-section, (see Fig. 11,) and when closed on the box it rests in a groove 21, formed in the top thereof and which is shaped suitably for the lever to fit snugly within it. This peculiar shape of the lever and the groove or recess 21 has an advantage in that the edge 22 of the lever acts to clear the groove of any dirt or ice that may collect in it.

The contact or switch arm 15 is so adjusted on shaft 16 that it stands out of contact with the terminal 14 when the contact-lever 17 is lying flat down upon the top of the box in normal position. When this lever or circuit-completer 17 is raised up, as shown in Fig. 1, the switch is thereby closed and the lever is energized by the current.

The hinged lever 17, which I also term the "circuit-completer," since its function is to close the switch of the branch conductor and complete the circuit between it and a contact device on the car, is raised up by having its free end attracted by a magnetic contact device or bar 23, which is carried upon the car some little distance above the ground. This bar is flexible laterally in the horizontal and is suitably insulated from its supports on the car. In the present construction this magnetic contact is supported from the car-truck 24 by means of hangers or brackets 25 25, so that the contact device is always carried substantially parallel with the surface of the road and is kept independent of the movements of the car-body, which is not shown, but which is attached to the sill or frame 26. This contact-bar consists of an iron channel-bar having upon each side or leg thereof a winding 27, (see Fig. 2,) which is connected with a battery 31, carried upon the car, and by means of which current is passed through the coil 27 for the purpose of energizing said contact-bar and causing it to attract and hold to its under surface the circuit-completers when once they are brought in contact with it. This bar is electrically connected with the motor 28, which propels the car, by means of wire 29, (shown in dotted lines,) so that as long as one of the circuit-completers or levers 17 is in contact with the bar the current is supplied to the motor from the main conductor 55 by way of the branch conductor, the switch therein and its circuit-completer, the contact-bar 23, and line 29.

In Fig. 3 is shown a modification of the long magnet or contact-bar 23. In this form the winding 27 is located upon the central portion of the channel-iron instead of upon the sides thereof.

In Figs. 4 and 5 is shown another modification of this contact device. In this form there are used two parallel bars 50 50, each having upward extensions 51, (see Fig. 5,) connected by a yoke-piece 52, and the windings 27 are placed around the extensions 50, so as to give the same effect as in the other forms. If preferred, the lower edges of these magnetic contact-bars may be faced with Harveyized steel.

As the contact device 23 forms part of the circuit and is therefore alive with current of full potential, it must be kept some considerable distance from the surface of the ground—say, for example, three inches. I therefore prefer to provide additional magnetic mechanism, which may be carried closer to the ground than the contact-bar itself and which may in fact be safely carried so near to the ground as to touch the circuit-completers when in normal position in order to insure raising them up. I also make such mechanism yielding and spring-mounted in order that it may yield in case it should strike against the ground or collide with an obstacle. This mechanism is shown as made up of a set of bars or small magnets, with their pole-pieces in line and slightly overlapping, but not touching. In the construction shown in Figs. 1, 6, and 7 three magnets 32 are used, and they are arranged with axes of their coils horizontal, with their pole-pieces of horseshoe form and extended to form the shoe-like members 34, the lower edges of which make contact with the circuit-completing lever 17. These magnets are each secured by strips 35 to a swinging bracket 36, which is pivoted or hinged at 37 to the adjacent end of the contact-bar 23, while its outer end has pivoted thereto a rod 38, which slides loosely through a plate 39, fixed upon a cross-piece of the truck-frame 24. The end of this rod or link 38 is provided with a nut or stop 40 for preventing it from being withdrawn therefrom, and a spring 41, which surrounds the rod and bears with its upper end upon the plate 39 and with its lower end upon a fixed piece 42 on the rod, serves to keep down the bracket 36 with spring-pressure. These magnets serve as an extension of the contact-bar down close to the surface of the ground to pick up the circuit-completers 17, and they are each insulated from the contact bar or magnet 23, as well as from each other, they being separated by an inch space, making in the aggregate three inches of air-space for insulation between the ground and the positive side of circuit or bar 23. This is required because the lower magnet passes closely over all crossing rails which form the negative side of the circuit. The extension or shoe 34 of the magnet at the outer end of the set is curved slightly upward, as at 43, in order that it may readily ride over any obstacle that it may meet with, the spring-mounting of the bracket 36 readily permitting the upward movement of the bracket carrying the magnets.

In Fig. 8 I show a slight modification of the construction of the set of magnets, each of which consists of a U-shaped member having a coil 44 wound about each of the depending arms, the lower ends of which are enlarged so as to form the shoe-like pieces 34 for sliding over the contact-lever 17. These magnets are secured to the vertically-swinging bracket 36, as in the other form, and they operate in the same way as the magnets which have already been described. In constructing this part of the apparatus I prefer to make the bracket 36 of steel and the pole-pieces of the magnets of wrought-iron, with their edges faced with Harveyized steel, as indicated at 45 in Fig. 8, in order to withstand the wear to which they are subjected in sliding over the circuit-completing levers which they attract thereto.

In both the contact device and the pick-up it is preferable to use magnets of the horseshoe type, since both poles of the same can be utilized to good advantage, since the magnet-poles come in actual contact with the levers 17 and thereby insure the lifting of the same economically, whatever power is found to be necessary.

The end magnets are connected with the cells of the battery 31 by means of the line 60, and a switch 61 serves to connect one of the sets of end magnets at a time with the battery, since only one set, and that the forward one, need be energized at a time. The contact-magnet 23 has its coil 27 in circuit with the battery by means of wires 62 and 60, so that it is constantly energized by the current therefrom.

In the feeder system which I herewith show I employ duplicate main conductors 55, so that in case there is any defect occurring in one the other may readily be called into service. At intervals of about every street-block a branch conductor 70 leads from each of the duplicate main conductors into a junction-box 56, which may be placed on a post located along the curb-line of the street, or which may be set down in the ground flush with the surface of the street. Within this box is located a switch 57, which serves to connect either one of the duplicate main conductors at will with a set of the circuit-completers. The circuit-completers and their switch-boxes are arranged in groups along each street-block and each group is controlled by one junction-box 56, which contains a magnetic cut-out or circuit-breaker 59, through which all the circuit-completers of a group are fed. If through any trouble beyond a junction-box either in the car or on the track the cut-out opens the circuit, a car which should happen to be or to run onto this dead-block would of course come to a standstill. The car conductor has to then simply unlock the junction-box of that block and throw the handle that resets the cut-out. If this cuts out again, he knows that there is a short circuit and he must look for trouble along the tracks on that block. The trouble might possibly be below the ground, but the feed-wire and switch-boxes are so well protected that this could rarely occur, and as such trouble is most likely to be above ground it can be quickly remedied without a material delay in running the cars.

From the foregoing description the operation of the invention will be readily understood.

As the car passes along the lower magnet of the set seizes onto a circuit-completing lever 17 and lifting it to itself slides over it as the car moves onward. In this way the lever is gradually raised until it is presented to the contact-bar 23, which holds it thereto as it slides over it. The switch of the circuit-completer is closed a little before the contact-bar 23 meets the raised circuit-completing lever 17, and this serves to bring the bar in circuit with the main conductor while such bar is in contact with one of the circuit-completing levers, and as the bar is connected with the motor the current is thus supplied to the same, either the rails or the earth being used as a return for the current. Just before the forward movement of the car has brought the said contact-lever 17 near the rear end of the contact-bar another lever is raised into contact with the forward end of the bar, and then the first-mentioned lever passes off from the bar along the magnets at the rear end, which at this time are of course not charged, and the lever then drops into place. This keeps on uninterruptedly, and the current is thus continually supplied to the motor to propel the car. If one of the levers fails to rise and the car has not sufficient momentum to carry it along to the next lever, it can be pushed along by a following car until it is brought over the next succeeding lever. It is thus evident that the line could never be entirely stopped, since it is so minutely subdivided.

Having thus described my invention, what I claim, and desire to secure by Letters Patent, is—

1. A car provided with a magnetic contact device carried a considerable distance above the ground for attracting and holding the circuit-completers in magnetic and electric contact therewith, and a set of magnets arranged at the end of said contact device for gradually raising the circuit-completers into contact with said contact device.

2. A car provided with a magnetic contact device carried a considerable distance above the ground for attracting and holding the circuit-completers in magnetic and electric contact therewith, and a set of magnets extending from the end of said contact device downwardly toward the ground for gradually raising the circuit-completers into contact with said contact device.

3. A car provided with a magnetic contact device carried a considerable distance above the ground for attracting and holding the circuit-completers in magnetic and electric contact therewith, a set of insulated magnets arranged at the end of said contact device and disconnected therefrom for gradually raising the circuit-completers into contact with said contact device.

4. A car provided with a series of magnets, the middle one of which constitutes a long contact device, the magnets at each end of the series being insulated from each other and arranged with their pole-faces in a line with each other and inclined downwardly toward the ground, a main conductor provided at intervals with branch conductors each having a circuit-completer adapted to be magnetically picked up by the end magnets and gradually raised thereby into electrical contact with the middle magnet.

5. A car provided with a long magnetic contact device or bar carried a slight distance above the surface of the ground and longitudinally of the car, a movable set of small magnets arranged at one or both ends of said contact device or bar and in a line therewith and inclining downwardly from the end thereof, and a set of circuit-completers for connecting the main conductor with said contact device or bar, said circuit-completers being adapted to be magnetically attracted by the magnets at the forward end of said contact device and placed in contact with said bar.

6. A car provided with a long magnetic contact device or bar carried a slight distance above the surface of the ground and longitudinally of the car, a movable set of spring-mounted magnets arranged at one or both ends of said contact device or bar in a line therewith and inclined downwardly from the end thereof, and a set of circuit-completers for connecting the main conductor with said contact device or bar, said circuit-completers being adapted to be magnetically attracted by the magnets at the forward end of said contact device and placed in contact with said bar.

7. A car provided with a long magnetic contact device or bar placed longitudinally of the car, a pivoted spring-mounted frame or bracket mounted at the end of said device or bar and extending beyond the same in line therewith, and a set of pick-up magnets mounted upon said frame.

8. A car provided with a long magnetic contact device or bar carried longitudinally beneath the same, and a circuit-completer for connecting the main conductor with said contact device or bar, said circuit-completer comprising an L-shaped metallic lever 17 pivoted in the horizontal at the end of one of its members on an axis parallel with the axis of the other member, said lever being adapted to be raised above the ground by the magnetic attraction of said contact device or bar into contact therewith and held with the said other member in lengthwise contact with it.

9. A car provided with a contact device, a main conductor having at intervals normally open branch conductors each provided with a circuit-completer 17 adapted to be moved into contact with said contact device of the car, each of said branch conductors being provided with a normally open switch having a water-tight box or casing inclosing the same, a threaded rock-shaft 16 extending through a correspondingly-threaded opening in the side of said box or casing and controlling the operation of the switch located therein, said circuit-completer 17 being mounted upon the outer end of the shaft and serving to actuate the same when moved into contact with said device on the car.

10. A circuit-completer comprising a pivoted metallic lever lying normally in the surface of the roadway and adapted to be raised into contact with a device on a car, the lower side of said lever being formed with a wedge-shaped edge or rib, and a socket shaped to receive said wedge-shaped edge or rib, whereby the movement of said lever in and out of the socket will serve to clear the same of foreign matter or dirt.

11. An electric switch incased in a water-tight shell or casing, a rock-shaft extending through the casing for operating the switch, said shaft having a threaded bearing for rendering the joint water-tight.

12. A main conductor provided at intervals with branch conductors each having a normally open switch located therein, a water-tight housing or casing inclosing said switch, a circuit-completer having a rock-shaft extending through a wall of said housing or casing and serving to open and close the switch, the said shaft having a number of separate thread-like projections encircling its shaft.

13. A car provided with a magnetic contact device or bar 23, a main conductor provided at intervals with branch conductors, a circuit-completer for each branch conductor adapted to engage said magnetic contact device and be held in magnetic contact therewith, and a movable set of pick-up magnets, 32, 32, extending in line from the end of said contact-bar 223 for magnetically attracting said circuit-completers and raising them into contact with said bar.

In testimony whereof I have hereunto set my hand, this 29th day of July, 1895, in the presence of the two subscribing witnesses.

FRANK MANSFIELD.

Witnesses:
HENRY B. HUGHES,
ANNA H. YORSTON.